(12) United States Patent
Korpi et al.

(10) Patent No.: US 6,784,926 B1
(45) Date of Patent: Aug. 31, 2004

(54) METHOD AND ARRANGEMENT FOR PROCESSING CCD PIXEL DATA

(75) Inventors: Jarmo Korpi, Nousiainen (FI); Donal Denvir, Belfast (GB)

(73) Assignee: Wallac Oy, Turku (FI)

( * ) Notice: Subject to any disclaimer, the term of this patent is extended or adjusted under 35 U.S.C. 154(b) by 0 days.

(21) Appl. No.: 09/521,963

(22) Filed: Mar. 9, 2000

(30) Foreign Application Priority Data

Mar. 11, 1999 (FI) .................................................. 990536

(51) Int. Cl.[7] .............................................. H04H 5/225
(52) U.S. Cl. ................. 348/207.99; 348/125; 348/132; 348/294
(58) Field of Search .................... 348/207.99, 125–129, 348/132, 294, 295, 297, 298, 308; 250/208.1, 370.01, 559.3; 382/132, 275; 378/98.8, 87

(56) References Cited

U.S. PATENT DOCUMENTS

| | | | |
|---|---|---|---|
| 5,498,324 A | | 3/1996 | Yeung et al. |
| 5,724,401 A | * | 3/1998 | Kurtz et al. ................ 378/171 |
| 5,742,659 A | * | 4/1998 | Atac et al. ................. 378/98.8 |
| 5,848,123 A | * | 12/1998 | Strommer ................. 378/98.8 |
| 5,973,310 A | * | 10/1999 | Lunscher ................. 250/203.1 |
| 6,058,160 A | * | 5/2000 | Kurtz ........................... 378/70 |
| 6,069,933 A | * | 5/2000 | Schultz ........................ 378/62 |
| 6,485,625 B1 | * | 11/2002 | Simpson et al. ............ 204/601 |
| 2002/0191828 A1 | * | 12/2002 | Colbeth et al. ............. 382/132 |
| 2002/0196899 A1 | * | 12/2002 | Karellas ..................... 378/98.8 |
| 2003/0151683 A1 | * | 8/2003 | Karunen et al. ............ 348/246 |

FOREIGN PATENT DOCUMENTS

| | | |
|---|---|---|
| WO | WO 96/05488 | 2/1996 |
| WO | WO 96/35810 | 11/1996 |

\* cited by examiner

*Primary Examiner*—Aung Moe
(74) *Attorney, Agent, or Firm*—Young & Thompson

(57) ABSTRACT

This invention relates generally to the processing of measured data. Especially the invention applies to the binning procedure of data which is measured with a CCD (Charge-Coupled Device) sensor unit. The invention is preferably used in photometrics for measuring radiation from samples on a well plate. It is the objective of the present invention to create a solution, in which a good signal-to-noise value is achieved, and the measuring results of the neighbouring sample wells can still be well separated. This objective is achieved in photometrics application by selecting the binning factor on the basis of position and size of sample wells on a well plate (530, 550). With the present invention it is possible to achieve a maximal signal-to-noise ratio, because all pixels within the image area of one sample are accumulated. However, since the pixels between the sample images are not accumulated with the pixels within the sample images (526, 546), the problem of interference between samples can be avoided.

12 Claims, 3 Drawing Sheets

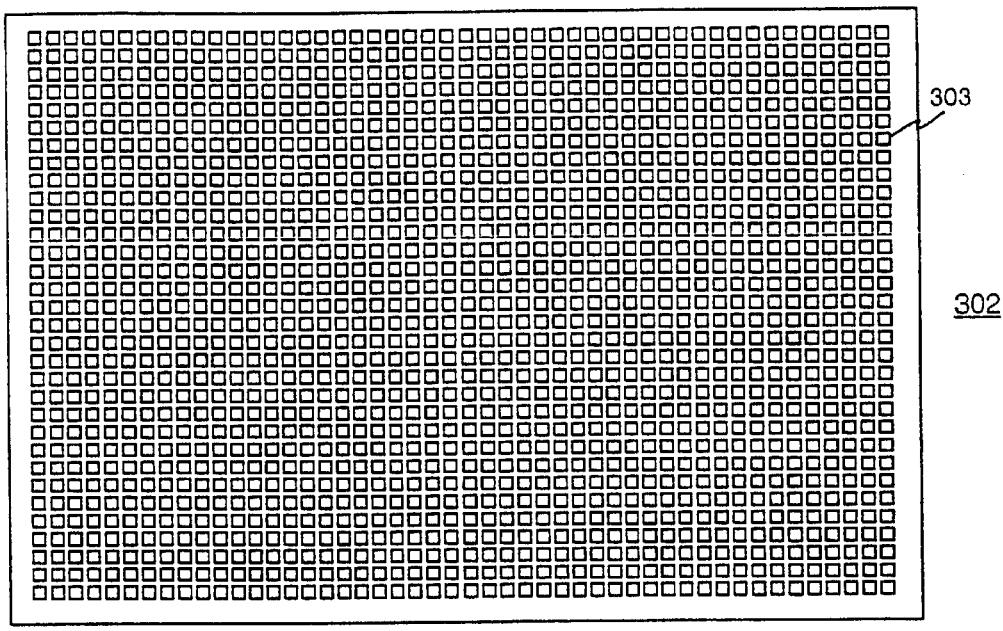
Fig. 3
(PRIOR ART)
Fig. 4
(PRIOR ART)
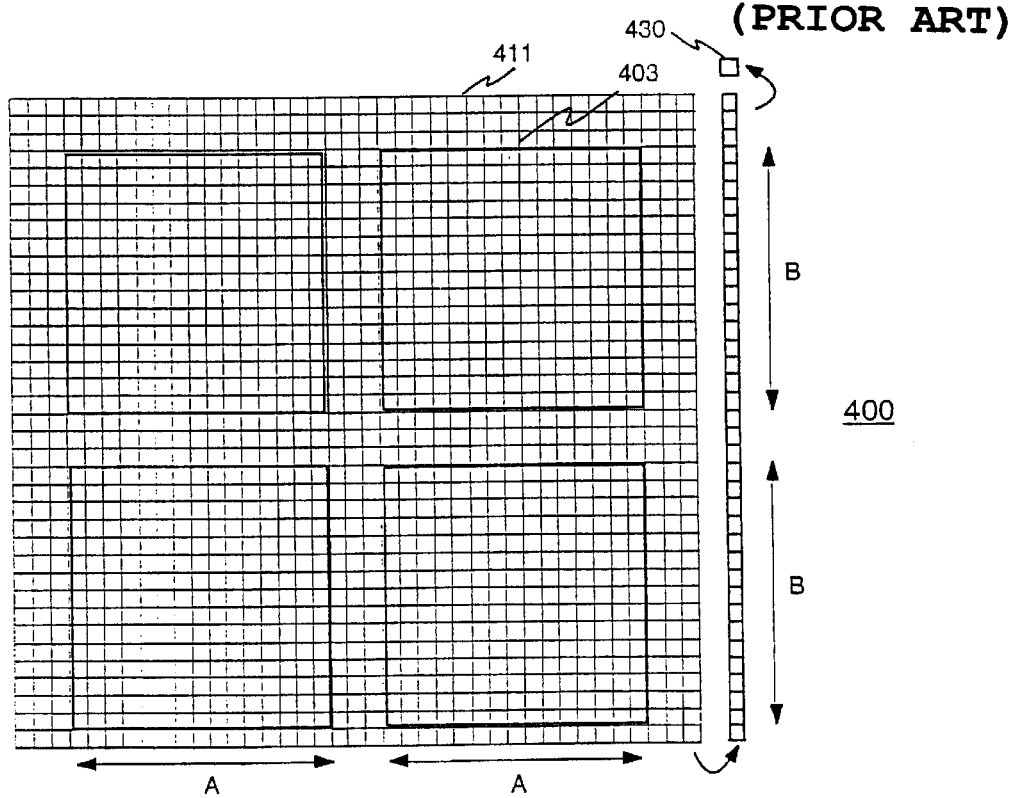

METHOD AND ARRANGEMENT FOR
PROCESSING CCD PIXEL DATA

BACKGROUND OF THE INVENTION

This invention relates generally to the processing of measured data. Especially the invention applies to the binning procedure of data which is measured with a CCD (Charge-Coupled Device) sensor unit. The invention is preferably used in photometrics for measuring radiation from samples on a well plate. One purpose of the invention is to achieve improvement in signal-to-noise values of the measurements.

CCD sensors are generally used in photometrics for measuring radiation, such as light, from samples. The samples are usually inserted into wells on a well plate in a photometrics equipment. FIG. 1 shows a prior art arrangement of a photometrics device 100. The samples to be measured are inserted onto a well plate 102. The samples may be excited with radiation from a lamp unit 104. The excitation radiation 106 is reflected by a beam-slitter mirror 108 onto the well plate. The lamp unit 104 is controlled to give radiation with a determined intensity. After a possible excitation, the radiation 110 from the samples is led to a CCD unit 120. A lens system 112 creates an image of the samples onto a CCD screen. The exposure period is controlled with a shutter 116. The radiation is further filtered with an emission filter 114 in order to select the determined wavelength of radiation for the measurement. The lamp unit 104, the shutter 116 and the CCD unit 120 are controlled with a control unit 130. The measurement process is further controlled by a computer unit 140. The computer unit also processes the output data of the measurements to achieve radiation intensity results.

FIG. 2 illustrates registers of a CCD unit 200. The CCD unit comprises a parallel register 210 that consists of a matrix of charge wells 211. As the surface is exposed to radiation, charges are formed into the charge wells according to the intensity of the radiation exposure. A charge pattern thus accumulates in the parallel register. After the exposure the charge wells or "pixels" of the matrix are read by shifting the charges at each row of the parallel register towards a shift register or "serial register" 220. After shifting the charges by one step, the charge wells of the shift register comprise charges of one column of the parallel register. The shift register is then read by shifting the charges at the shift register towards an output charge well or "output node" 230. After each step of shifting the output node is read. After all the charge wells of the shift register are read, the charges at the parallel register are further shifted by one step. The readout procedure is further repeated until the whole parallel register is read. The measurement data is thus converted into serial set of pixel charge values that present radiation intensities at the pixels. FIG. 2 also shows images of four samples 203 of a well plate. After processing the ouput data, an image can be formed where pixels within the sample image area present the radiation intensity of the corresponding positions within the sample image.

One problem in photometrics is related to the fact that the intensity of the radiation is low and therefore the signal-to-noise ratio of the measurement data may be low. In order to increase the signal-to-noise ratio, binning method is often used. Binning is a technique of combining charge from adjacent pixels during the readout process. The charge is collected as described above, but the readout is programmed differently. With parallel binning, when charge is shifted from the parallel register into the shift register, charge is accumulated from two or more columns before the serial shifting begins. With serial binning, two or more charge packets are similarly accumulated in the output node before the charge is digitalized and read out.

Binning is specified by a binning factor, which is the number of pixels to be combined on the CCD, for example "2×2 binning". If binning is used, the capacity of the shift register and the output charge well must be designed according to the total charge of the pixels that are accumulated in binning.

Binning improves the signal-to-noise ratio and extends the dynamic range of the CCD imager, but at the expense of spatial resolution. Binning is thus useful in applications where resolution is not of primary concern. Because binning reduces the number of pixels to be processed and digitized, the readout speed is also increased. If, for example, 2×2 binning is used, the resolution (number of pixels in the corresponding direction of the image) becomes half of the corresponding resolution without binning, and the signal-to-noise value becomes twice as good as the corresponding value without binning. This improvement of signal-to-noise value is related to the noise from the parallel register of the CCD unit. However, the signal-to-noise value related to the readout noise improves even by the binning factor. Binning has been advantageous in photometrics, because there has been no need for obtaining a high resolution.

There has been a requirement of increasing the measuring capacity by increasing the number of samples on a well plate. Therefore, instead of well plates with 8×12 wells there are now well plates with 32×48=1536 wells, for example. The size of wells have accordingly become smaller. FIG. 3 shows a well plate 302 with 32×48 wells 303 in an actual size. FIG. 4 further shows an image of 4 samples 403 on the surface of a CCD unit 400. Especially when the well plates with small wells are used there is a following disadvantage with the prior art binning method: When the distance between the sample wells is small, the number of CCD charge wells 411 within the area between the samples is also small. In the example of FIG. 4 there is only 3 pixels between the sample images. If the binning factor is close to the number of pixels in that area, it is possible that radiation from a sample well affects the result of the neighbouring pixel well thus causing interference between sample images. Therefore it is not possible to adequately separate the radiation of the neighbouring sample wells. Another problem is that it is not possible to achieve an adequate signal-to-noise ratio from the radiation of the small samples in order to get accurate results in a moderate imaging time.

SUMMARY OF THE INVENTION

It is the objective of the present invention to create a solution, in which a good signal-to-noise value is achieved, and interference between the measuring results from different positions can still be avoided. This objective is achieved in photometrics application by selecting the binning factor on the basis of position and size of sample wells on a well plate.

The number of pixels that are accumulated preferably equals the number of pixels in within the sample well image. Thus, if there are e.g. 15 pixels within the sample image row or column, they are preferably all accumulated in binning. The pixels that are outside the sample image area can be ignored. For example, in the arrangement of FIG. 4 the pixels "A" would be parallel binned and the pixels "B" would be serial binned in the readout process. The rest of the pixels could be ignored.

With the present invention it is possible to achieve a maximal signal-to-noise ratio, because all pixels within the image area of one sample are accumulated. However, since the pixels between the sample images are not accumulated with the pixels within the sample images, the problem of interference between samples can be minimized.

The invention applies to a method for measuring radiation from an object with a charge coupled device comprising a matrix of pixels arranged in rows and columns, in which method the radiation creates charges to the charge wells of the pixels, charges from a column of the pixels is shifted to a shift register, the charges in a shift register are shifted to an output charge well, the charge is measured from the output charge well and charges from at least two pixels are accumulated into the output charge well, characterised in that the pixels whose charges are accumulated are determined on the basis of the position and the dimension of a detail in the object.

The invention also applies to an arrangement for measuring radiation from an object comprising a charge coupled device with a matrix of charge wells arranged in rows and columns of pixels, the arrangement comprising a shift register for receiving charges from a column of the parallel register pixels, output well for receiving charges from the shift register, means for measuring the charge from the output well and means for accumulating charges from at least two pixels characterised in that the arrangement further comprises means for determining the accumulated pixels on the basis of the position and the dimesion of a detail in the object.

BRIEF DESCRIPTION OF THE DRAWINGS

In the following, the invention is described in more detail by means of the attached drawings in which FIG. 3 illustrates a well plate with a large number of wells, FIG. 4 illustrates an image of a well plate on a CCD surface and FIG. 5 illustrates a flow diagram of a method according to the invention for processing radiation measurement data.

DESCRIPTION OF THE PREFERRED EMBODIMENTS

FIGS. 1–4 were explained above in the prior art description. In the following the invention is described in more detail referring to FIG. 5.

Figure 1:
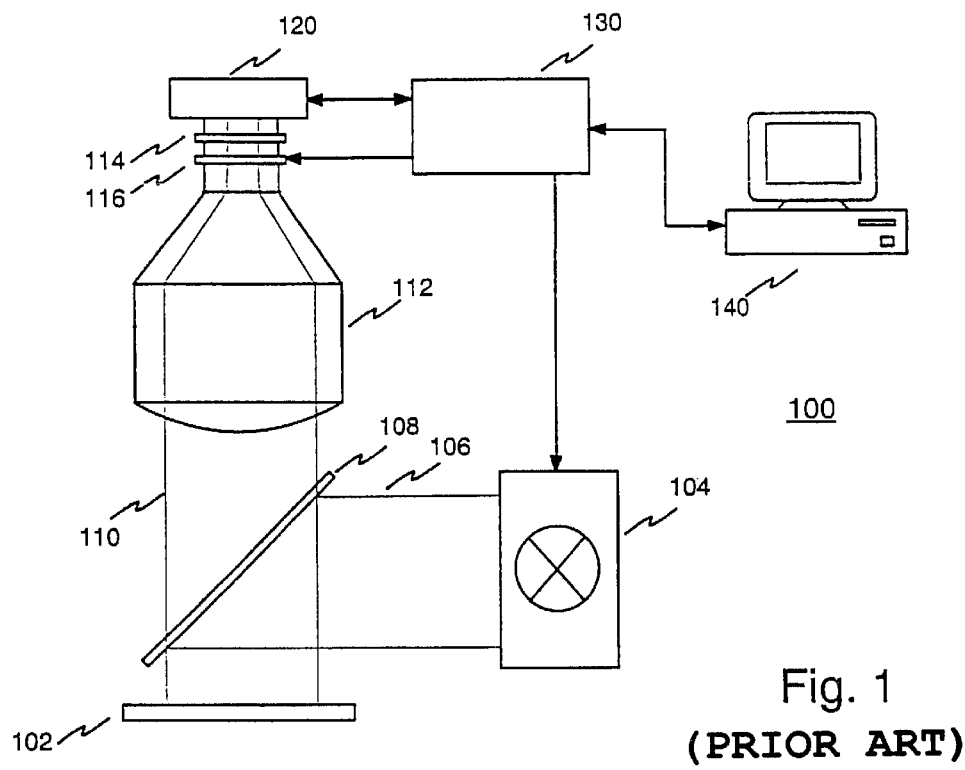
FIG. 1 illustrates a prior art arrangement for photometric measurements.
Figure 2:
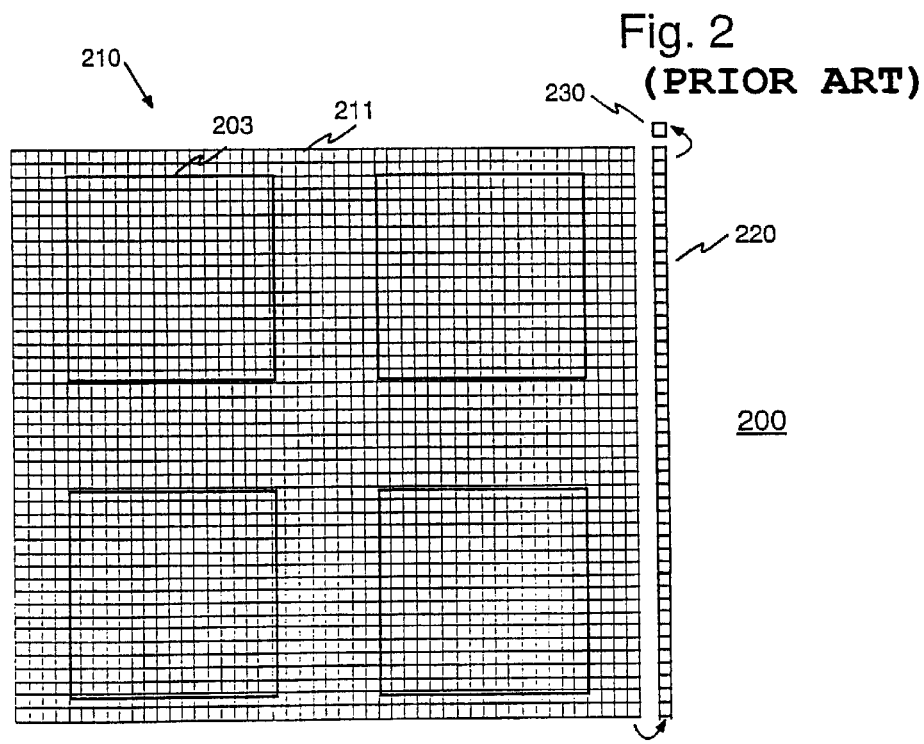
FIG. 2 illustrates registers of a prior art CCD unit.
Figure 5:
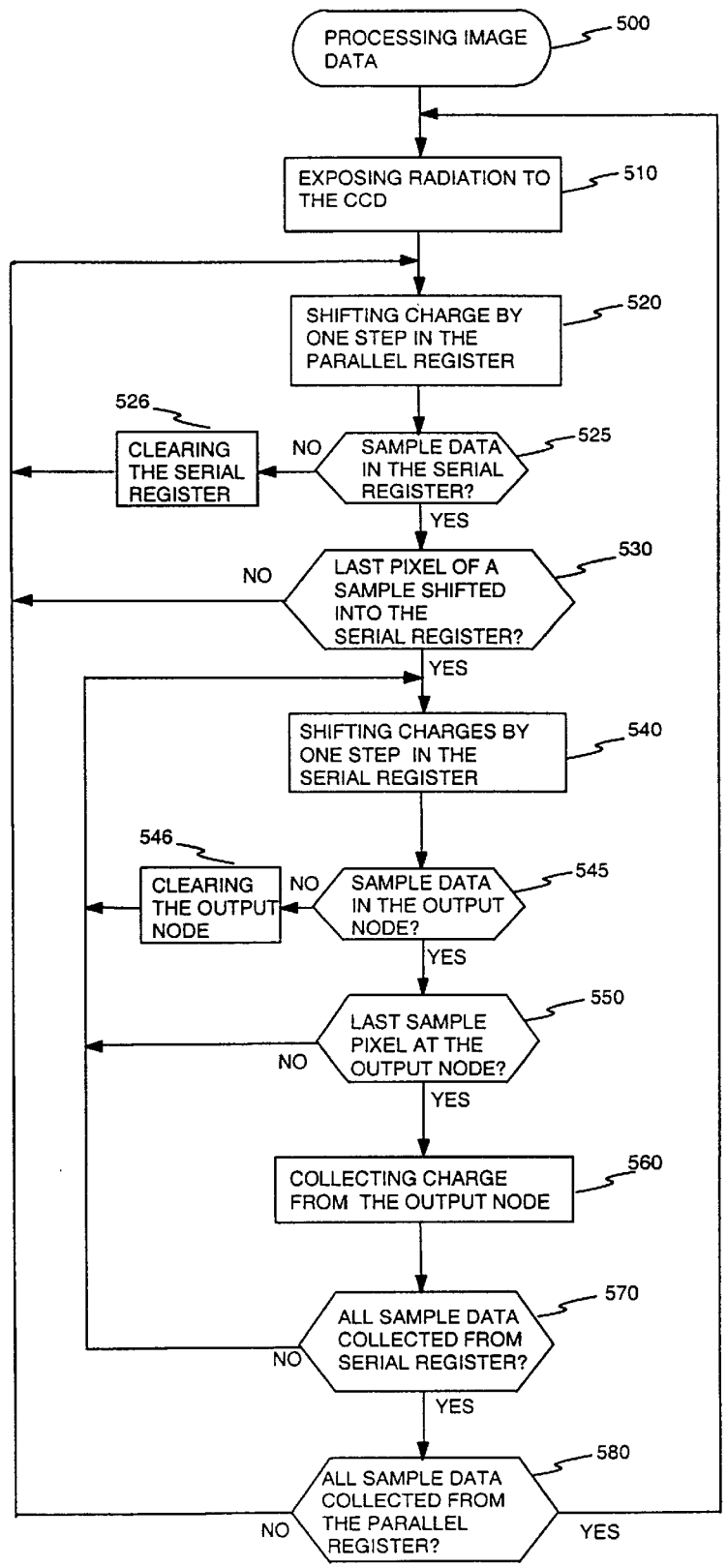

FIG. 5 illustrates a flow diagram of one method according to the invention 500. The CCD unit is first exposed to radiation, 510. In the next phase 520 charges of the parallel register are shifted by one step/pixel. Thus one column of the parallel register is transferred to the shift register. If the pixel column that is transferred to the shift register is not from a sample image area, 525, the shift register is cleared, 526, and phase 520 is then repeated. When pixels of a sample image are shifted into the shift register in phase 520, they will be accumulated into the shift register until the last pixel of a sample image enters the shift register, phase 530.

When the last pixel of a sample image is shifted into the shift register, the shift register will be read. Thus the charges in the shift register are shifted by one step towards the output node, 540. If the charge that is shifted to the output node does not represent data of a sample image in phase 545, the output node is cleared, 546. When charges representing a sample image are shifted into the output node in phase 540, they will be accumulated into the output node until the charges of a sample image enters the output node in phase 550. When the last charges of a sample image are shifted into the output node, the output node will be read, phase 560. The "clearing" of the shift register and the output node can be made simply by shifting the charges away from the charge well. It is also possible that the charge data that does not represent the sample images is collected and measured, but not used for the calculation of the intensity of the sample radiation.

If there is still sample data in the shift register in phase 570, the phases 540–560 are repeated. When all the sample data is collected from the shift register, it will be checked, whether all sample data is collected from the parallel register, phase 580. If there is still sample data in the parallel register in phase 580, the phases 520–570 are repeated. When all the sample data is collected from the parallel register the CCD can be exposed for a new measurement, if necessary.

It should be noted that, although the binning factor preferably equals the number of pixels in the corresponding direction within the sample well image, also other, especially smaller binning factors can be used. Furthermore, the binning factors for the rows and columns of the parallel register do not need to be equal. The wells on the well plate are preferably right angled. One well plate may also include wells of different sizes. However, in order to achieve a maximal accumulation of charges, one of the edges should be of the same size in all wells.

In the inventive arrangement an ordinary CCD unit can be used. However, the charge capacities of the shift register and the output node must be designed according to the sample well size, ie. the maximum number of accumulated pixels. However, in case the samples are small and the radiation intensity from a sample is not high, it is not a problem to achieve an adequate charge capacity. On the other hand, when large samples are measured, it is not necessary to accumulate charges from all pixels of one sample, but the pixels can in that case be accumulated in several parts.

It should also be noted that the "shift register" of the CCD unit can be separate from the parallel register, or a column at the edge of the parallel register can also function as a shift register, because the charges of the parallel register can usually be shifted in both horizontal and vertical directions. It is thus possible also to divide the CCD pixel matrix in functional blocks by having several columns of the pixel matrix functioning as a readout serial shift register, each shift register having a separate output charge well. This way the efficiency of readout process can be increased.

In order to maximize the advantages of the inventive solution, the image matrix of the sample wells should be positioned parallel in relation to the matrix of the pixels of the CCD unit.

Usually the system has the information on the size and positions of the wells in the well plate that is used in the measurement. However, it is also possible to take a preliminary image from the sample well with the measuring equipment and using the image to determine the positions and sizes of the sample wells for further measurements. This way it would be possible to use different kind of well plates and it would not be necessary to input manually the information on type of each well plate.

The control of the measuring process in a photometrics device takes place in an arrangement of processing capacity in the form of microprocessor(s) and memory in the form of memory circuits. Such arrangements are known as such from the technology of CCD devices and relating equipment. To convert a known photometrics device into an equipment according to the invention it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

Above, an embodiment of the solution according to the invention has been described. The principle according to the invention can naturally be modified within the frame of the scope defined by the claims, for example, by modification of the details of the implementation and ranges of use.

It is especially to be noted that the invention is not in any way restricted to the applications of measuring sample radiation, but it can be used in many either applications as well. The invention can be, for example, used in any CCD imaging equipment, where the resolution and accuracy requirements depend on the position within the image. Thus any details from the image can be identified and the accuracy of intensity information within the selected detail can then be improved by binning the pixels within the selected detail of the object image.

In the field of photometric sample measurements the present invention is not in any way limited to applications where sample excitation is used, but the invention can also be used in measurements that are based, for example, on luminescence.

What is claimed is:

1. A method for measuring radiation from an object with a charge couple device (CCD) that has a matrix of pixels arranged in rows and columns, the method comprising the steps of:

placing the object in a field of the CCD;

forming a preliminary image of the object;

determining a position of a detail in the object from the preliminary image of the object;

creating charges in the pixels with radiation from the object;

shifting the charges from a column of the pixels to a shift register;

shifting the charges from the shift register to an output charge well; and measuring the charges in the output charge well by accumulating charges from plural pixels that are selected based on the determined position of the detail of the object.

2. The method of claim 1, wherein the step of determining a position further includes determining a dimension of the detail of the object.

3. The method of claim 2, wherein the determining step determines an areal size of the detail.

4. The method of claim 2, further comprising the step of setting charge capacities of the shift register and of the output charge well based on the determined areal size of the detail.

5. The method of claim 1, wherein the object is a well plate and the detail is a sample or well.

6. The method of claim 1, wherein the charges are accumulated only from pixels defining the detail of the object.

7. A device for measuring radiation from an object with a charge couple device (CCD) that has a matrix of pixels arranged in rows and columns, the device comprising:

means for forming a preliminary image of the object that has been placed in a field of the CCD;

means for determining a position of a detail in the object from the preliminary image of the object;

means for creating charges in the pixels with radiation from the object;

means for shifting the charges from a column of the pixels to a shift register;

means for shifting the charges from the shift register to an output charge well; and means for measuring the charges in the output charge well by accumulating charges from plural pixels that are selected based on the position of the detail of the object determined by the means for determining.

8. The device of claim 7, wherein the means for determining a position further includes means for determining a dimension of the detail of the object.

9. The device of claim 8, wherein the means for determining determines an areal size of the detail.

10. The device of claim 9, further comprising means for setting charge capacities of the shift register and of the output charge well based on the determined areal size of the detail.

11. The device of claim 7, wherein the object is a well plate and the detail is a sample or well.

12. The device of claim 7, wherein the means for measuring accumulates charges only from pixels defining the detail of the object.

* * * * *